(12) United States Patent
Yang et al.

(10) Patent No.: US 12,353,186 B2
(45) Date of Patent: Jul. 8, 2025

(54) METHOD, APPARATUS, DEVICE FOR LIMITING MACHINING ELEMENT, PROGRAM MEDIUM AND COMPUTER NUMERICAL CONTROL MACHINE

(71) Applicant: MAKEBLOCK TXZW CO., LTD., Guangdong (CN)

(72) Inventors: Chen Yang, Guangdong (CN); Shiling Wu, Guangdong (CN)

(73) Assignee: MAKEBLOCK TXZW CO., LTD., Guangdong (CN)

( * ) Notice: Subject to any disclaimer, the term of this patent is extended or adjusted under 35 U.S.C. 154(b) by 0 days.

(21) Appl. No.: 18/947,929

(22) Filed: Nov. 14, 2024

(65) Prior Publication Data

US 2025/0076840 A1 Mar. 6, 2025

Related U.S. Application Data

(63) Continuation-in-part of application No. PCT/CN2024/102297, filed on Jun. 28, 2024.

(30) Foreign Application Priority Data

Jun. 28, 2023 (CN) .......................... 202310782945.2
Jun. 13, 2024 (CN) .......................... 202410762098.8

(51) Int. Cl.
G05B 19/19 (2006.01)
(52) U.S. Cl.
CPC .... *G05B 19/19* (2013.01); *G05B 2219/45041* (2013.01)

(58) Field of Classification Search
USPC ....................................................... 700/186
See application file for complete search history.

(56) References Cited

U.S. PATENT DOCUMENTS

| 7,845,541 | B1 * | 12/2010 | Chen .................... | B23K 3/0638 |
| | | | | 228/43 |
| 9,469,033 | B2 * | 10/2016 | Thomas ................ | B25J 11/005 |
| 10,621,461 | B1 * | 4/2020 | Huber .................... | G06V 10/82 |

(Continued)

FOREIGN PATENT DOCUMENTS

| CN | 101298116 | 11/2008 |
| CN | 105722639 | 6/2016 |

(Continued)

OTHER PUBLICATIONS

TW_I621497_B (Year: 2018).*

(Continued)

*Primary Examiner* — Hien D Khuu
(74) *Attorney, Agent, or Firm* — Hodgson Russ LLP

(57) ABSTRACT

A method, apparatus, device for limiting a machining element, computer program medium and computer numerical control machine is provided, the method includes: determining a machining region of a machining member and a positioning region of a positioning member based on a movable range of a movable head, the machining member and the positioning member are mounted at different positions of the movable head, respectively; determining a limitation region on a target interface based on the machining region and the positioning region; and generating a corresponding prompt information when the machining element is in the limitation region.

19 Claims, 8 Drawing Sheets

Determining Machining Region of Machining Member and Positioning Region of Positioning Member Based on Movable Range of Movable Head, Machining Member and Positioning Member are Mounted at Different Positions of Movable Head, Respectively — S210

Determining Limitation Region on Target Interface Based on Machining Region and Positioning Region — S220

Generating Corresponding Prompt Information When Machining Element is in Limitation Region — S230

(56) References Cited

U.S. PATENT DOCUMENTS

| | | | |
|---|---|---|---|
| 2003/0178398 A1 | 9/2003 | Nagatoshi et al. | |
| 2009/0182449 A1* | 7/2009 | Frei | B23C 3/18 |
| | | | 409/131 |
| 2010/0147815 A1* | 6/2010 | Hildebrand | B23K 26/04 |
| | | | 219/121.72 |
| 2017/0255180 A1* | 9/2017 | Miyake | G05B 19/4086 |
| 2017/0277156 A1* | 9/2017 | Deguchi | G05B 19/0426 |
| 2021/0228705 A1* | 7/2021 | Coleman | A61K 39/12 |
| 2023/0206441 A1* | 6/2023 | Zhong | G06V 20/49 |
| 2023/0229134 A1* | 7/2023 | Itou | G05B 19/402 |
| | | | 700/1 |

FOREIGN PATENT DOCUMENTS

| | | |
|---|---|---|
| CN | 110560884 | 12/2019 |
| CN | 116021148 | 4/2023 |
| JP | 2011194432 | 10/2011 |

OTHER PUBLICATIONS

CN_110936184_A (Year: 2020).*
WIPO, International Search Report for PCT/CN2024/102297, Sep. 29, 2024.

* cited by examiner

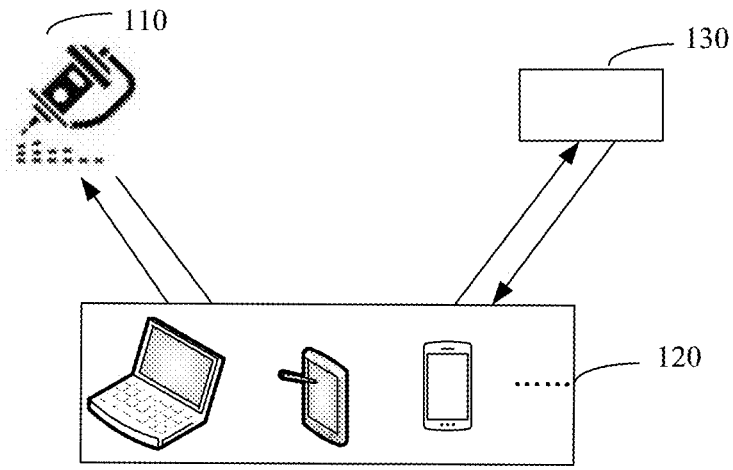

FIG. 1

```
Determining Machining Region of Machining Member and Positioning      S210
Region of Positioning Member Based on Movable Range of Movable Head,
  Machining Member and Positioning Member are Mounted at Different
              Positions of Movable Head, Respectively
```

```
Determining Limitation Region on Target Interface Based on Machining   S220
              Region and Positioning Region
```

```
Generating Corresponding Prompt Information When Machining Element is  S230
                       in Limitation Region
```

FIG. 2

METHOD, APPARATUS, DEVICE FOR LIMITING MACHINING ELEMENT, PROGRAM MEDIUM AND COMPUTER NUMERICAL CONTROL MACHINE

CROSS-REFERENCE TO RELATED APPLICATIONS

This application is a continuation in part of International Application No. PCT/CN2024/102297, filed on Jun. 28, 2024, which claims priority to Chinese Application No. 202310782945.2, filed on Jun. 28, 2023, and Chinese Application No. 202410762098.8, filed on Jun. 13, 2024, the entire disclosures of which are hereby incorporated herein by reference.

TECHNICAL FIELD

The present disclosure belongs to the field of laser machining technology, and specifically relates to a method, apparatus, device for limiting a machining element, program medium and computer numerical control machine.

BACKGROUND

The machining elements set by the user in the target interface exceed the corresponding surfaces of the machining member, but the user does not realize it, it will easily lead to machining failures.

SUMMARY

There are provided a method, apparatus, device and computer program medium for limiting a machining element according to embodiments of the present disclosure. The technical solution is as below:

According to a first aspect of embodiments of the present disclosure, there is provided a method for limiting a machining element, which includes:

determining a machining region of a machining member and a positioning region of a positioning member based on a movable range of a movable head, the machining member and the positioning member are mounted at different positions of the movable head, respectively;

determining a limitation region on a target interface based on the machining region and the positioning region; and generating a corresponding prompt information when the machining element is in the limitation region.

According to a second aspect of embodiments of the present disclosure, there is provided a system, including:

at least one data processor; and at least one non-transitory computer-readable medium; and program instructions stored on the non-transitory computer-readable medium are executable by the at least one processor to make the system to perform a method for limiting a machining element, the method including:

determining a machining region of a machining member and a positioning region of a positioning member based on a movable range of a movable head, wherein the machining member and the positioning member are mounted at different positions of the movable head, respectively;

determining a limitation region on a target interface based on the machining region and the positioning region; and generating a corresponding prompt information when the machining element is in the limitation region.

According to a third aspect of embodiments of the present disclosure, there is provided a device for limiting a machining element, which includes:

a memory storing computer readable instructions; and a processor, reading the computer-readable instructions stored in the memory to perform the method as mentioned above.

According to a fourth aspect of embodiments of the present disclosure, there is provided a computer program medium, on which computer-readable instructions are stored, wherein the computer-readable instructions, when executed by a processor of a computer, cause the computer to perform the method as mentioned above.

According to a fifth aspect of embodiments of the present disclosure, there is provided a computer numerical control machine, which includes:

a slide rail;

a movable head slidably provided on the slide rail;

a communication component, for receiving a limitation region and a prompt information obtained by the method as mentioned above; and a controller, for controlling a movement of the movable head on the slide rail to machine a surface of a machining material based on at least the limitation region and the prompt information.

Other features and advantages of the present disclosure will become apparent through the following detailed description, or will be learned in member through the practice of the present disclosure.

It should be understood that the above general description and the detailed description that follows are merely exemplary and do not limit the present disclosure

BRIEF DESCRIPTION OF THE DRAWINGS

The foregoing and other objects, features, and advantages of the present disclosure will become more apparent by describing in detail exemplary embodiments thereof with reference to the accompanying drawings.

FIG. 1 is a schematic diagram of an architecture to which a method for limiting a machining element is applied according to an embodiment of the present disclosure.

FIG. 2 is a flowchart of the method for limiting a machining element according to an embodiment of the present disclosure.

DETAILED DESCRIPTION OF THE EMBODIMENTS

Figure 3:
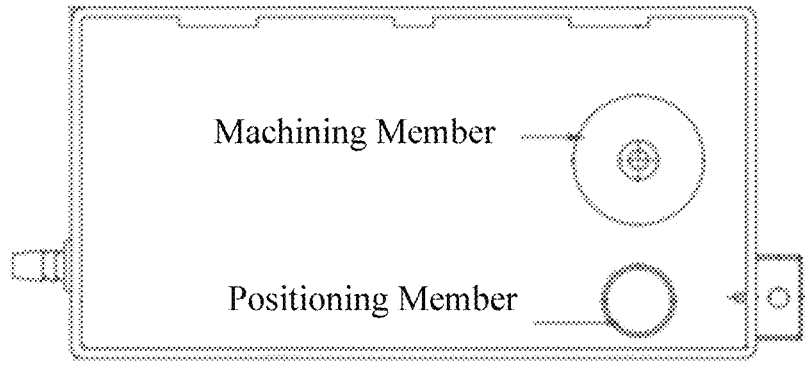
FIG. 3 is a schematic diagram of a hardware structure of a laser head according to an embodiment of the present disclosure.

Embodiments will now be described more fully with reference to the accompanying drawings. However, the embodiments can be implemented in a variety of forms and should not be construed as limitation to the examples set forth herein; rather, the provision of these embodiments allows for the description of the present disclosure to be more comprehensive and complete and conveys the idea of embodiments in a comprehensive manner to those skilled in the art. The accompanying drawings are only schematic illustrations of the present disclosure and are not necessarily to scale. Identical accompanying symbols in the drawings indicate identical or similar portions, and thus repetitive descriptions of them will be omitted.

In addition, the features, structures, or characteristics described may be combined in one or more embodiments in any suitable manner. In the following description, many specific details are provided thereby giving a full understanding of the embodiments of the present disclosure. However, those skilled in the art will realize that it is possible to practice the technical embodiments of the present disclosure and omit one or more of the particular details, or that other methods, groups of elements, steps, etc. may be employed. In other cases, the publicly known structures, methods, implementations, or operations are not shown or described in detail to avoid overshadowing and obscuring aspects of the present disclosure.

The flowcharts shown in the accompanying drawings are merely exemplary illustrations and are not required to include all elements and operations/steps, nor are they required to be performed in the order depicted. For example, some operations/steps may also be decomposed, while others may be combined or partially combined, and thus the order in which they are actually performed is likely to change depending on the actual situation.

Some of the block diagrams shown in the accompanying drawings are functional entities that do not necessarily have to correspond to physically or logically separate entities. It is possible to implement these functional entities in software form, or to implement them in one or more hardware modules or integrated circuits, or to implement them in different networks and/or processor devices and/or microcontroller devices.

Since the light outlet of the machining member and the light outlet of the positioning member in the movable head are not in the same position, and there is a certain physical distance between the two light outlets, thus the machining member and the positioning member correspond to two inconsistent positions in a size when they are mapped in the target interface, respectively. When machining, if the machining elements set by the user in the target interface exceed the corresponding surfaces of the machining member or the positioning member, and the user does not realize it, it will easily lead to machining failures.

Understandably, if the final effect of machining is not optimal, it can be regarded as a machining failure. Specifically, when the machining element is in the limitation region, the effect presented by the execution of the machining are not optimal. If the machining element is in the limitation positioning region, the effect presented by the execution of the machining are not optimal. If the machining element is in the limitation machining region, the result of presented by the execution of machining is not optimal. When the machining element is in the limitation machining and positioning region, the effect presented by the execution of the machining is still not optimal.

Thus, the present disclosure provides a method, apparatus, device for limiting a machining element, and a computer program medium.

Referring to FIG. 1, FIG. 1 is a schematic diagram of an architecture applied by embodiments of the present disclosure. The architecture 100 may include: a moveable head 110, a communication medium 120, and a software 130. The moveable head is a mechanical module included in the machining device and is not equivalent to the machining device, and the moveable head may include a laser head, a knife cutter head, a plasma cutter head, a water pistol head, a drill, a pen head, etc., and is not uniquely limited herein. The communication medium 120 may be a device such as a walkie-talkie, a cell phone, a tablet computer, and a mobile internet device that supports at least data communication via the 3rd generation partnership project (3GPP) protocol. The communication medium 120 is provided with a software 130, through which a target interface can be presented. The movable head 110 and the communication medium 120 may be connected to each other via a wireless communication link, thereby enabling wireless data communication interactions, or a wired communication link or a fiber optic cable, etc., which is not limited in the present disclosure herein.

It should be understood that the number of communication mediums 120 in FIG. 1 is merely illustrative. There may be any number of communication mediums 120 as needed for implementation.

Some technical embodiments of the present disclosure may be concretely implemented based on an architecture shown in FIG. 1 or a morphing architecture thereof.

Referring to FIG. 2, FIG. 2 is a flowchart of a method for limiting the machining element according to an embodiment of the present disclosure. The method may be applicable to the architecture shown in FIG. 1, for example, may be specifically performed by the communication medium 120. Of course, the method may also be applicable to other architectures, which is not limited in this embodiment.

As shown in FIG. 2, the method includes:

Step S210, determining a machining region of a machining member and a positioning region of a positioning member based on a movable range of a movable head, wherein the machining member and the positioning member are mounted at different positions of the movable head, respectively;

Step S220, determining a limitation region on a target interface based on the machining region and the positioning region; and Step S230, generating a corresponding prompt information when the machining element is in the limitation region.

These three steps are described in detail below, respectively.

In step S210, it is necessary to first explain that, due to the limitations of the hardware structure of the machining device, the movable heads mounted on the machining device all have their own limited maximum movement range, the maximum movement range of the movable head may be different for different machining devices, thus the limited maximum movement range of the movable head can be obtained according to the hardware structure of the machining device to which the movable head belongs. The movable range is not equivalent to the maximum movement range, and a small range of the maximum movement range may also be selected by the user as the movable range, which is not limited in the present disclosure herein.

Exemplarily, if the user wants to machine in the center region of the maximum movement range, the user can select this center region as the movable range, and it should be noted that although the region outside the center region and within the maximum movement range is objectively still reachable by the movable head, it is regarded as a limitation region due to the limitation imposed by the user. As a result, the movable range of the movable head can be defined according to the user's machining needs, thereby obtaining a more precise limiting effect and improving a success rate of machining.

Based on the movable range of the movable head, the machining region of the machining member and the positioning region of the positioning member on the machining platform can be determined, and the machining region of the machining member and the positioning region of the positioning member in the target interface can be determined, which is not limited in the present disclosure herein. According to an embodiment of the present disclosure, when the machining region and the positioning region in the target interface are determined based on the movable range, it may be possible to first determine the machining region and the positioning region on the machining platform based on the movable range, and then map the machining region and the positioning region on the machining platform to the target interface accordingly; or it may be possible to first determine the region of the movable range in the target interface, and then determine the machining region and the positioning region in the target interface based on a physical distance (e.g., a ratio of the physical distance to the entire movable range) of the machining member and the positioning member, which is not limited in the present disclosure herein.

Referring to FIG. 3, FIG. 3 is a schematic diagram of a hardware structure of a laser head according to an embodiment of the present disclosure. As shown in the figure, since there is a certain physical distance between the machining member and the positioning member of the laser head, the range of the machining region of the machining member and the range of the positioning region of the positioning member of the laser head are not the same on the machining platform of the machining device. The machining member may be a device that machines the material to be machined, and the positioning member may be a device that positions the machining element.

In an embodiment of the present disclosure, the positioning member may perform red cross positioning by emitting red cross light. The limitation positioning region may be a limitation red cross positioning region. The limitation machining and positioning region may be a limitation machining and red cross positioning region.

In another embodiment of the present disclosure, the positioning member may also perform low light positioning when there is insufficient ambient light or poor light conditions. The limitation positioning region may also be a limitation low light positioning region. The limitation machining and positioning region may be a limitation machining and low light positioning region.

Figure 4:
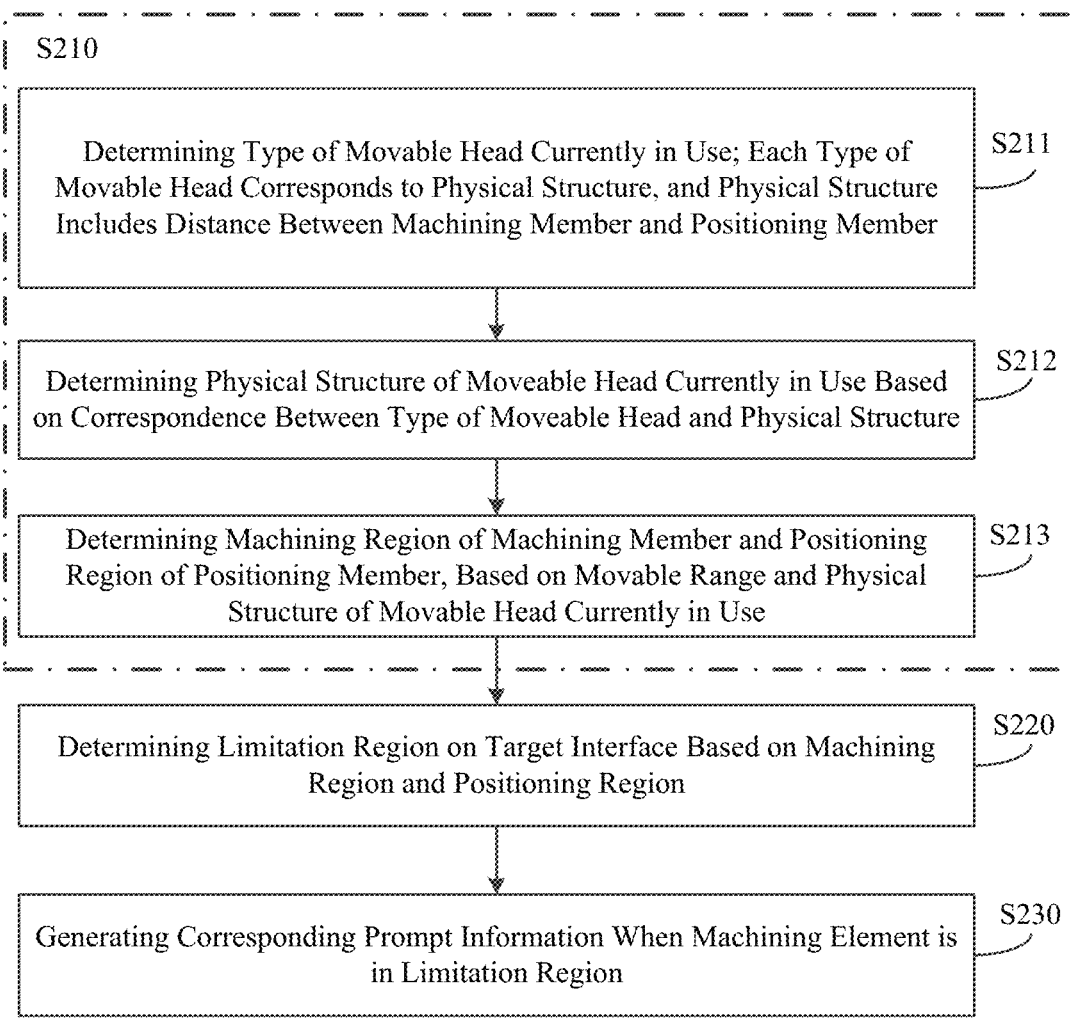
FIG. 4 is a flowchart of a method for limiting the machining element according to another embodiment of the present disclosure.

Referring to FIG. 4, FIG. 4 is a flowchart of a method for limiting the machining element according to another embodiment of the present disclosure, in this embodiment, a step S210 of determining a machining region of the machining member and a positioning region of the positioning member based on a movable range of the movable head may includes:

Step S211, determining a type of the movable head currently in use; wherein each type of the movable head corresponds to a physical structure, and the physical structure includes a distance between the machining member and the positioning member;

Step S212, determining the physical structure of the moveable head currently in use based on a correspondence between the type of the moveable head and the physical structure; and Step S213, determining the machining region of the machining member and the positioning region of the positioning member, based on the movable range and the physical structure of the movable head currently in use.

These three steps are described in detail below, respectively.

In step S211, a type of the movable head currently mounted in the machining device for use is determined, and the type of the movable head includes a type, a size, a power, etc., of the movable head. The moveable head includes a laser head, a knife cutting head, a plasma cutting head, a water pistol head, a drill head, a pen head, etc., and the power of the moveable head may be 5 watts, 8 watts, 10 watts, 18 watts, 20 watts, 36 watts, 40 watts, etc. Each type of moveable head corresponds to a physical structure, i.e., a distance between the machining member and the positioning member of the moveable head, but it is noted that the physical structures of different types of moveable heads may be the same or different.

In step S212, according to the correspondence between the type of the movable head and the physical structure, a physical structure of the movable head currently mounted in the machining device for use is determined, and exemplarily, if the movable head is a laser head of 50 watts, a physical structure of the laser head of 50 watts can be determined according to the correspondence between the type of the movable head and the physical structure. If the movable head is a high-pressure water pistol head, the physical structure of the high-pressure water pistol head can be determined according to the correspondence between the type of the movable head and the physical structure.

In step S213, the machining region of the machining member and the positioning region of the positioning member are determined based on the movable range and the physical structure of the movable head currently in use.

As can be seen from the above, the present embodiment can be used with different types of movable heads in the machining device, which improves the applicability of the movable head mounted in the machining device, and determines the physical structure of the movable head based on the type of the movable head currently in use, so that the machining region and the positioning region determined are more accurate.

In step S220, the target interface may be an operation interface that can only be operated, or a display interface that can only be displayed, or an interface that can perform both display and be operated, which is not limited in the present disclosure herein. The limitation region may be a region where the machining element is limited, the limited operations include positioning and/or machining of the machining element, etc. The limitation region is obtained based on the machining region and the positioning region generated in the target interface, and the limitation region may include a limitation machining region, a limitation positioning region, and/or a limitation machining and positioning region.

If the machining region and the positioning region are determined in the target interface, the limitation region may be determined directly based on the machining region and the positioning region in the target interface. If the machining region and the positioning region are determined on the machining platform, the limitation region on the machining platform may be determined based on the machining region and the positioning region mapped in the target interface after the machining region and positioning region are mapped in the target interface.

Figure 5:
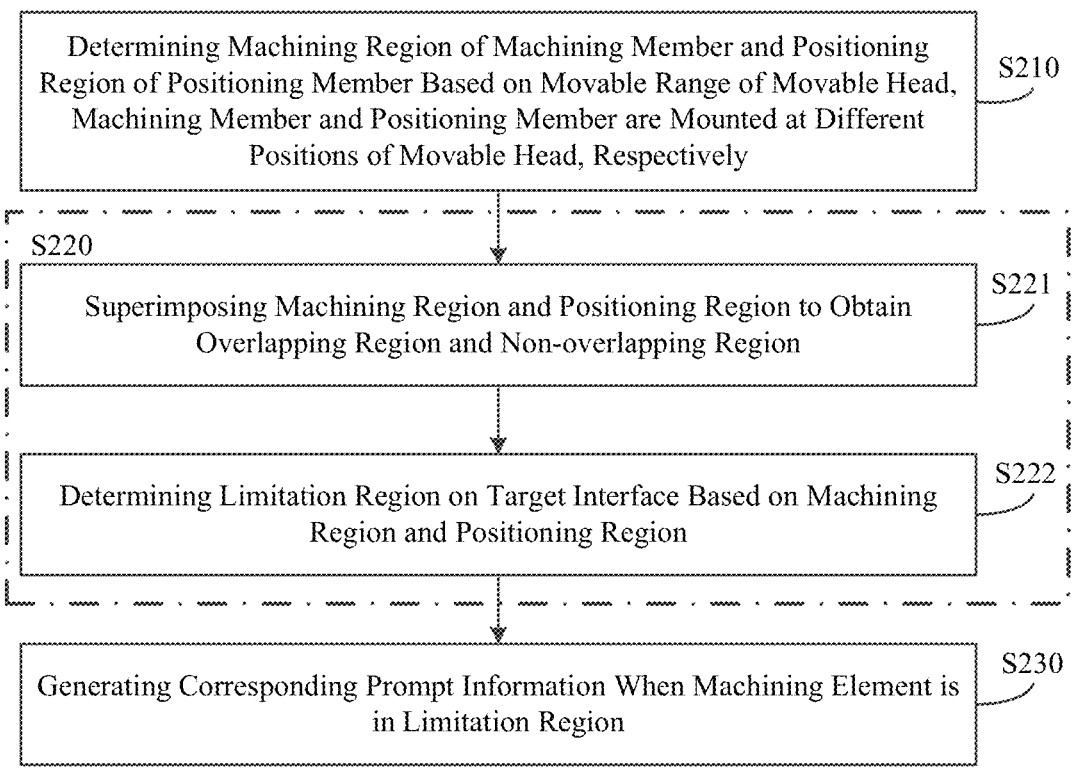
FIG. 5 is a flowchart of the method for limiting the machining element according to another embodiment of the present disclosure.

Referring to FIG. 5, FIG. 5 is a flowchart of a method for limiting the machining element according to another embodiment of the present disclosure, in this embodiment, step S220 of determining the limitation region in the target interface based on the machining region and the positioning region may include:

Step S221, superimposing the machining region and the positioning region to obtain an overlapping region and a non-overlapping region; and Step S222, determining the limitation region based on the overlapping region and the non-overlapping region.

These two steps are described in detail below, respectively.

In step S221, the machining region and the positioning region generated in the target interface are intersected to obtain the overlapping region where the machining region and the positioning region intersect, and the non-overlapping region where the machining region and the positioning region do not intersect. The non-overlapping region includes a region belonging to the machining region but outside the positioning region (i.e., the limitation positioning region) and a region belonging to the positioning region but outside the machining region (i.e., the limitation machining region).

In step S222, the region outside the overlapping region is the limitation region, the limitation region includes the limitation machining region, the limitation positioning region, and/or the limitation machining and positioning region.

Figure 6:
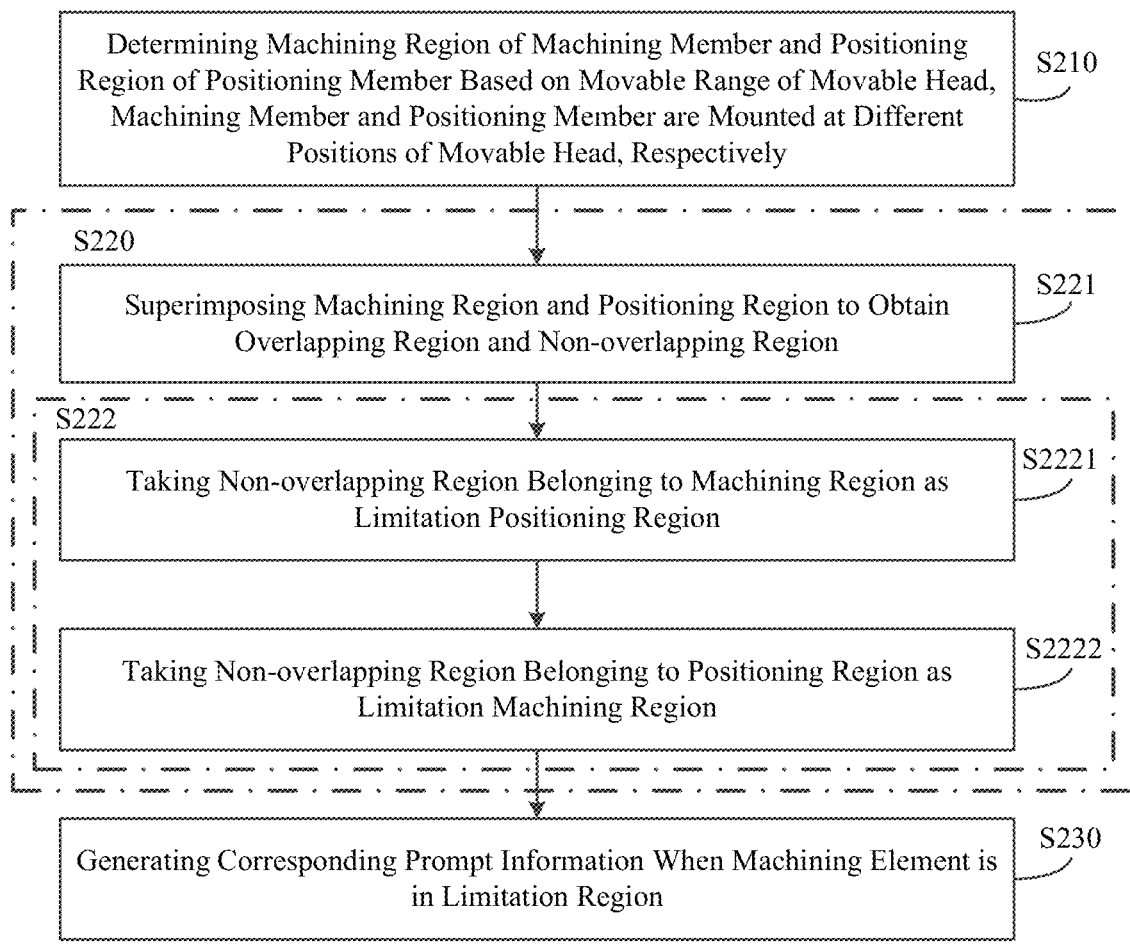
FIG. 6 is a flowchart of the method for limiting the machining element according to another embodiment of the present disclosure.

Referring to FIG. 6, FIG. 6 is a flowchart of a method for limiting the machining element according to another embodiment of the present disclosure, in this embodiment, a step S222 of determining the limitation region based on the overlapping region and the non-overlapping region may include:

Step S2221, taking the non-overlapping region belonging to the machining region as the limitation positioning region; and Step S2222, taking the non-overlapping region belonging to the positioning region as the limitation machining region.

These two steps are described in detail below, respectively.

In step S2221, the limitation positioning region is a region where the machining element can be machined but cannot be positioned.

In step S2222, the limitation machining region is a region where the machining element can be positioned but cannot be machined.

In another exemplary embodiment, the limitation region further includes a limitation machining and positioning region, the determining the limitation region based on the overlapping region and the non-overlapping region further includes:

taking a region beyond the overlapping region and the non-overlapping region as the limitation machining and positioning region.

According to an embodiment of the present disclosure, the limitation machining and positioning region is a region where neither machining nor positioning of the machining element is possible. Exemplarily, when the movable range selected by the user is smaller than the maximum movable range, the range of the limitation machining and positioning region thus determined will be larger, thus the range of limiting the machining element will be larger, so as to achieve a more accurate limitation effect, and to be able to improve the success rate of machining.

As can be seen from the above, the present embodiment divides the limitation region into the limitation positioning region, the limitation machining region, and/or the limitation machining and positioning region, so as to be able to accurately prompt the user that the machining element cannot be operated in different types of limitation regions.

In step S230, the machining element may correspond to an operation that the user intends to perform on the material to be machined, such as an engraving pattern corresponding to a pattern engraving, a cutting position corresponding to a material cutting, a graphic marker corresponding to marking, etc. The machining element may be a regular pattern such as a polygon, a circle, etc. and an irregular pattern such as an irregular human figure, a scenic picture, etc. The machining element can also be vector graphics or bitmap. The vector graphics, also known as vector graphics, is the image described by a series of geometric shapes (such as lines, curves, polygons, etc.), and can be enlarged or reduced without distortion. A bitmap, also known as a dot map, is an image simulated by many pixels, each pixel is described by a color value. When the machining element is in the limitation region, a corresponding limitation prompt is made according to the type of the limitation region. The limitation prompt includes, but is not limited to, a text prompt, a voice prompt, an auxiliary line prompt, and a mask layer prompt.

Exemplarily, when the machining element is in the limitation region, text prompts can be provided through a pop-up window to indicate that "the element is placed outside the positioning region, please adjust"; or voice prompts can be provided to indicate that "the machining element cannot be machined here, please adjust"; or by displaying an auxiliary line at the boundary of the limitation region; or by distinguishing the limitation region from the region outside the limitation region with different colors (e.g., by displaying a mask layer inside the limitation region, etc.), and other ways for limitation prompt. The way for limitation prompt may also be a combination of the above ways, which is not limited herein.

It should be noted that the timing of the limitation prompt by the software is not unique, and the present embodiment does not limit the timing. Specifically, the limitation prompt may be made when the machining element is in the limitation region, the machining element in the limitation region includes the machining element partially in the limitation region or the machining element completely in the limitation region.

Figure 7:
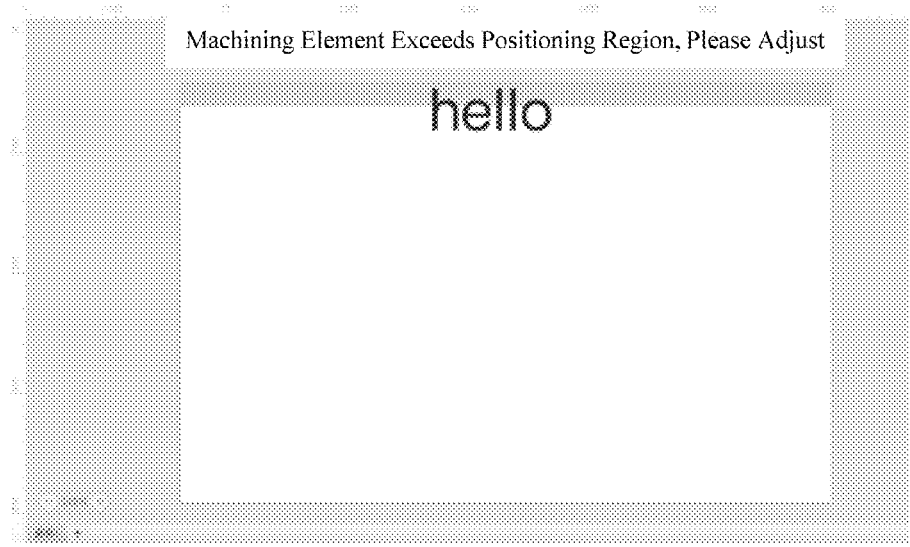
FIG. 7 is a schematic diagram of a limitation positioning prompt according to an embodiment of the present disclosure.

It is also possible to make corresponding limitation prompts when the operation limitation by the limitation region is performed in the software, for example, when the machining element is in the limitation machining region, if it is desired to perform a machining operation on the machining element at this time, a limitation machining prompt will be made. When the machining element is in the limitation positioning region, if it is desired to perform a positioning operation on the machining element at this time, a limitation positioning prompt will be made. Exemplarily, referring to FIG. 7, FIG. 7 is a schematic diagram of a limitation positioning prompt according to an embodiment of the present disclosure. The machining element "hello" is in the limitation positioning region, and at this time, when the positioning operation is performed in the software, the words "the machining element exceeds the positioning region, please adjust" will be popped up over the software for a text prompt.

In an embodiment of the present disclosure, if the positioning member performs red cross positioning, the machining element "hello" in FIG. 7 is in the limitation red cross positioning region, and at this time, when the positioning operation is performed in the software, the words "the machining element exceeds the red cross positioning region, please adjust" can be popped up over the software for a text prompt.

In another embodiment of the present disclosure, if the positioning member performs low light positioning, the machining element "hello" in FIG. 7 is in the limitation low light positioning region, and at this time, when the positioning operation is performed in the software, the words "the machining element exceeds the low light positioning region, please adjust" can be popped up over the software for a text prompt.

As can be seen from the above, this embodiment automatically performs the corresponding limitation prompts when the machining element is located in the limitation region, and prompts the user through the limitation prompts that the movable head can not perform the corresponding operation in the limitation region.

Figure 8:
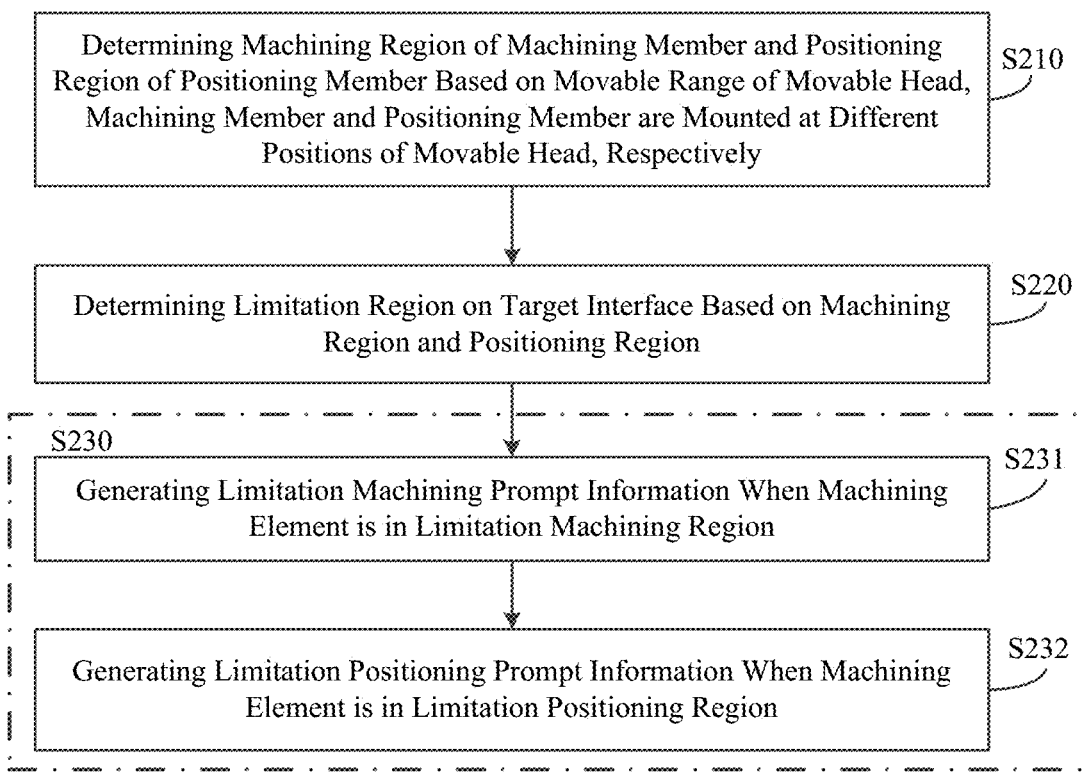
FIG. 8 is a flowchart of a method for limiting the machining element according to another embodiment of the present disclosure.

Referring to FIG. 8, FIG. 8 is a flowchart of a method for limiting the machining element according to another embodiment of the present disclosure, in the present embodiment, a step S230 of prompting the user when the machining element is located in the limitation region may include:

Step S231, generating a limitation machining prompt information when the machining element is in the limitation machining region; and Step S232, generating a limitation positioning prompt information when the machining element is in the limitation positioning region.

These two steps are described in detail below respectively.

In step S231, when the machining element is in the limitation machining region, the prompt information for limitation machining is generated in the software, i.e., the user is prompted that it is not possible to manipulate the movable head by the software to machine the machining element in the limitation machining region.

In step S232, when the machining element is in the limitation positioning region, the prompt information of limitation positioning is generated in the software, i.e., the user is prompted that it is not possible to manipulate the movable head by the software to position the machining element in the limitation positioning region.

In another exemplary embodiment, prompting the user when the machining element is in the limitation region further includes:

generating a limitation machining and positioning prompt information when the machining element is in the limitation machining and positioning region.

According to an embodiment of the present disclosure, when the machining element is in the limitation machining and positioning region, the prompt information for limitation machining and positioning is generated in the software, i.e., the user is prompted that it is not possible to manipulate the movable head by the software to machine and position the machining element in the limitation machining and positioning region.

As can be seen from the above, the present embodiment divides the operations limited in the limitation region, specifies the operation limitations on the machining elements in different types of limitation regions, the interaction experience between the user and the software can be improved.

In another exemplary embodiment, the generating corresponding prompt information when the machining element is in the limitation region includes:

displaying a first identification in the limitation machining region.

In another exemplary embodiment, when the machining element is in the limitation region, generating the corresponding prompt information includes:

displaying a second identification in the limitation positioning region.

In another exemplary embodiment, generating the corresponding prompt information when the machining element is in the limitation region further includes:

displaying a third identification in the limitation machining and positioning region.

According to an embodiment of the present disclosure, different identifications are displayed in the limitation machining region, the limitation positioning region and/or the limitation machining and positioning region, the different identifications include, but are not limited to, different types of the first identification, the second identification and the third identification, and the first identification, the second identification and the third identification are of the same type but with different symbol directions, etc. Exemplarily, different identifications are distinguished according to different graphics, such as a triangle is taken as the first identification, a circle is taken as the second identification, and a rectangle is taken as the third identification; a straight line is taken as the first identification, a dotted line is taken as the second identification, and a curve is taken as the third identification. Different identifications are distinguished according to the same type but different sign directions, such as a vertical line at a certain distance is taken as the first identification, a horizontal line at a certain distance is taken as the second identification, and an inclined line at a certain distance is taken as the third identification; a solid line inclined to the left is taken as the first identification, a solid line inclined to the right is taken as the second identification, and a vertical solid line is taken as the third identification.

In addition, it is also possible to display the first identification in the limitation machining region, the second identification in the limitation positioning region, and not display any identification in the limitation machining and positioning region, thus the user is also able to distinguish the limitation machining region, the limitation positioning region, and/or the limitation machining and positioning region.

As can be seen from the above, the present embodiment enables the user to accurately distinguish the type of the limitation region by displaying different identifications on the limitation machining region, the limitation positioning region and/or the limitation machining and positioning region, thereby helping to assist the user in accurately identifying the machinable region of the movable head, and enhancing the user's experience of use.

In another exemplary embodiment, the identification includes the first identification displayed in the limitation machining region, the second identification displayed in the limitation positioning region, and the third identification displayed in the limitation machining and positioning region. The first identification, the second identification, and the third identification have different colors.

According to an embodiment of the present disclosure, by displaying different color identifications on the limitation machining region, the limitation positioning region, and/or the limitation machining and positioning region, respectively, exemplarily, a red identification is taken as the first identification, a black identification is taken as the second identification, and a yellow identification is taken as the third identification, thereby also helping the user to accurately identify the limitation machining region, the limitation positioning region, and the limitation machining and positioning region of the movable head, thereby improving the user's experience of use.

Figure 9:
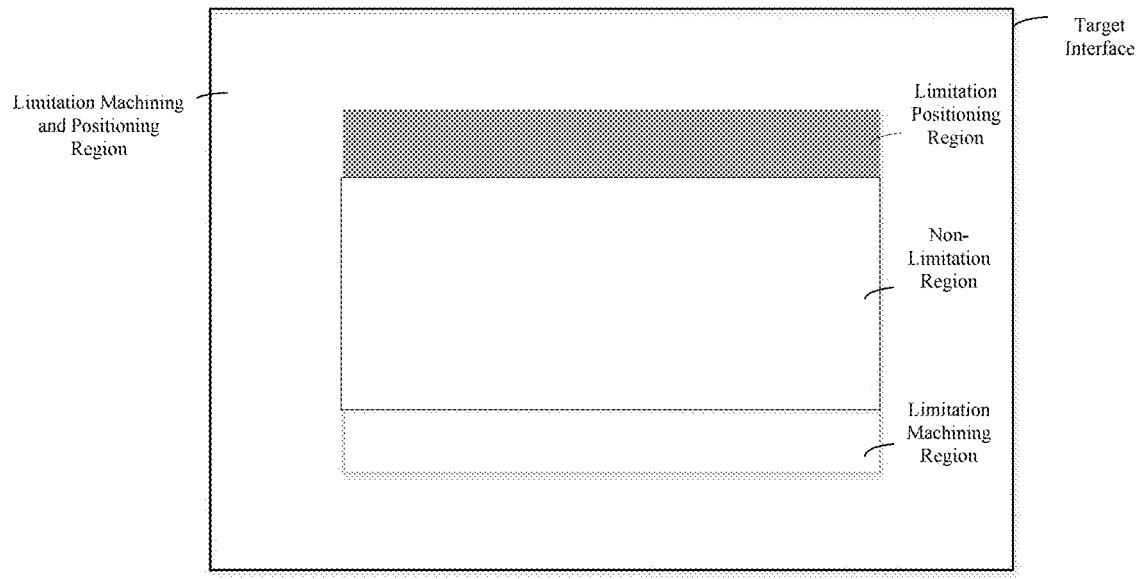
FIG. 9 is a schematic diagram of a gray mask layer display according to an embodiment of the present disclosure.

In another embodiment, the different color identifications are mask layers of different colors, such as a red mask layer is taken as the first identification, a gray mask layer is taken as the second identification, and a black mask layer is taken as the third identification. Referring to FIG. 9, FIG. 9 is a schematic diagram of a gray mask layer display according to an embodiment of the present disclosure. The upper portion of the non-limitation region is the gray mask layer identification displayed in the limitation positioning region, which guides the user that the positioning operation is not allowed in this gray mask layer region.

In addition, the different color mask layers include the same color mask layers but with different color shades, exemplarily, a dark gray mask layer is taken as a first identification, a silver gray mask layer is taken as a second identification, and a bright gray mask layer is taken as a third identification, which is not limited in the present disclosure herein.

Figure 10:
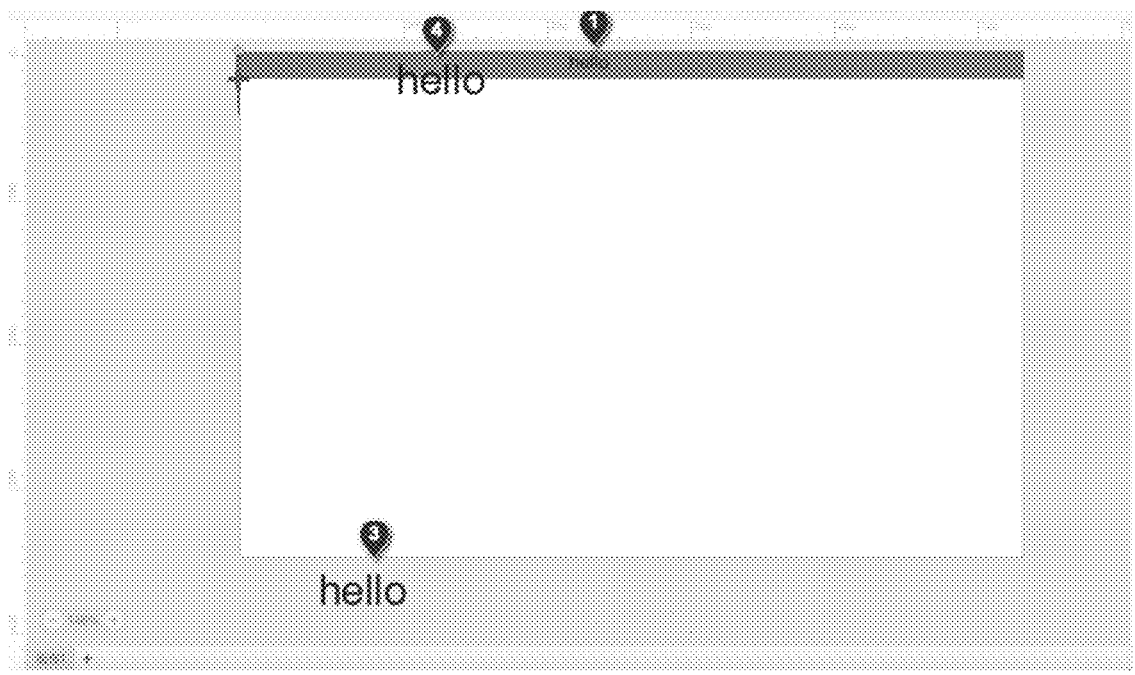
FIG. 10 is a schematic diagram of limiting different positions of the machining element according to an embodiment of the present disclosure.

Referring to FIG. 10, FIG. 10 is a schematic diagram of limiting different positions of the machining element, according to an embodiment of the present disclosure. Numbers 1, 3, and 4 indicate different positions of the machining member "hello" in the target interface (corresponding to different positions of the machining element on the machining platform of the machining device), number 4 indicates that the machining element is partially in the limitation positioning region, number 1 indicates that the machining element is completely in the limitation positioning region, number 3 indicates that the machining element is completely in the limitation machining region. Taking the laser head shown in FIG. 3 as an example, the positioning member is further away from the upper edge of the movable head than the machining member, and when the machining element is located in the positions indicated by numbers 1 and 4 (corresponding to proximity to the upper edge of the movable head), the positioning member cannot position, but since the machining member is closer to the upper edge of the movable head, thus the positions indicated by numbers 1 and 4 are still in the machining region, and therefore the movable head can machine at the positions indicated by numbers 1 and 4. Similarly, the position indicated by number 3 is close to the lower edge of the movable head, so that the positioning member closer to the lower edge can position the position indicated by number 3, and the machining member farther away from the lower edge cannot machine the position indicated by number 3. The white region in the figure is the overlapping region of the machining region and the positioning region, and when the machining element is completely in the white region, the user can perform machining, positioning and other operations on the machining element.

In one embodiment of the present disclosure, if the positioning member performs red cross positioning, number 4 in FIG. 10 indicates that the machining element is partially in the limitation red cross positioning region, number 1 indicates that the machining element is completely in the limitation red cross positioning region, and number 3 indicates that the machining element is completely in the limitation machining region.

In another embodiment of the present disclosure, if the positioning member performs low light positioning, number 4 in FIG. 10 indicates that the machining element is partially in the limitation low light positioning region, number 1 indicates that the machining element is completely in the limitation low light positioning region, and number 3 indicates that the machining element is completely in the limitation machining region.

As can be seen from the above, this embodiment displays different color mask layers on the limitation machining region and the limitation positioning region, which on the one hand helps guide the user to distinguish between different types of limitation regions when the user uploads machining elements of a larger surface, and on the other hand also preserves the machining element of an original size in the target interface to optimize the user experience.

In another exemplary embodiment, the method for limiting the position of the machining element further includes:
displaying an auxiliary line at a boundary of the overlapping region, and taking a region within the auxiliary line as a non-limitation region.

Figure 11:
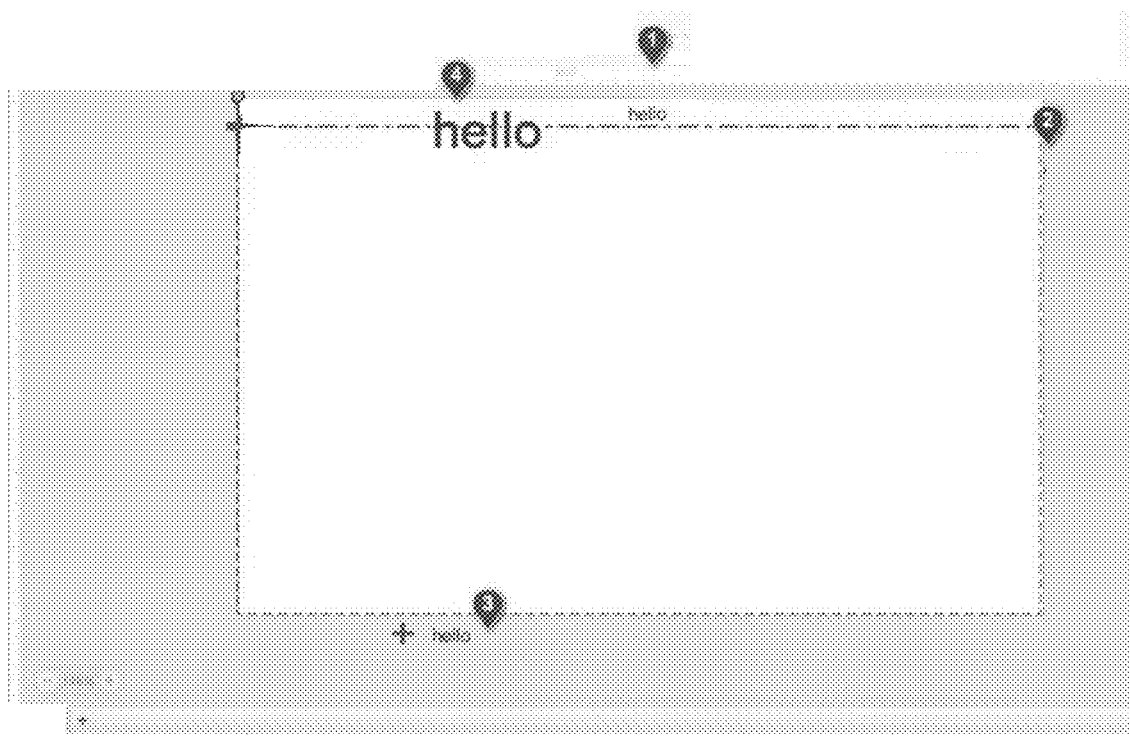
FIG. 11 is a schematic diagram of a construction of a surface auxiliary line according to an embodiment of the present disclosure.

According to an embodiment of the present disclosure, the overlapping region is the non-limitation region, and the auxiliary lines include, but are not limited to, dashed lines and solid lines. Referring to FIG. 11, FIG. 11 is a schematic diagram of a construction of a surface auxiliary line according to an embodiment of the present disclosure. The dashed lines shown in the figure are auxiliary lines shown at the boundary of the overlapping region of the machining region and the positioning region, and the region within the dashed lines is the non-limitation region, i.e., there is no operational limitation on the machining member within the dashed lines. If the machining element is partially or completely outside the non-limitation region, for example, if the positions indicated by numbers 1 and 3 in the figure are completely outside the non-limitation region, the operation of the machining element is limited to a certain extent, and the limited operation includes positioning, machining, etc.

As can be seen from the above, the present embodiment is able to prompt the user to determine the range of the non-limitation region by displaying the auxiliary line, which helps the user to perform corresponding operations on the machining elements within the non-limitation region.

Figure 12:
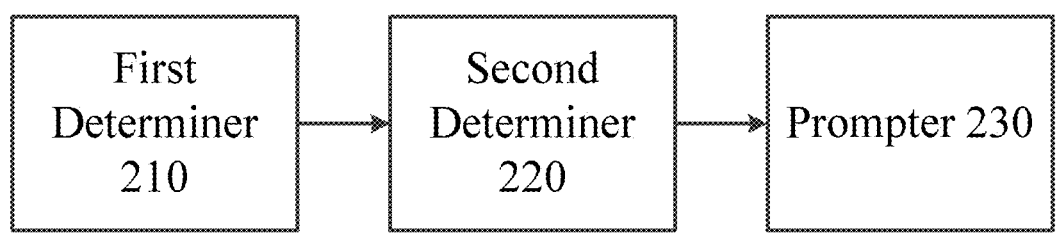
FIG. 12 is a block diagram of a device for limiting the machining element according to an embodiment of the present disclosure.

Referring to FIG. 12, according to an embodiment of the present disclosure, a device for limiting the machining element is provided as in FIG. 12, the device for limiting the machining element includes a first determiner 210, a second determiner 220, and a prompt 230.

The first determiner 210 is configured for determining a machining region of a machining member and a positioning region of a positioning member based on a movable range of a movable head, the machining member and the positioning member are mounted at different positions of the movable head, respectively.

The second determiner 220 is configured for determining a limitation region on a target interface based on the machining region and the positioning region.

The prompter 230 is configured for generating a corresponding prompt information when the machining element is in the limitation region.

In another exemplary embodiment, the first determiner 210 may include a type determiner 211, a physical structure determiner 212, a machining region and a positioning region determiner 213.

The type determiner 211 is configured for determining a type of the movable head currently in use; each type of the movable head corresponds to a physical structure, and the physical structure includes a distance between the machining member and the positioning member.

The physical structure determiner 212 is configured for determining a physical structure of the moveable head currently in use based on a correspondence between the type of the moveable head and the physical structure.

The machining region and a positioning region determiner 213 is configured for determining the machining region of the machining member and the positioning region of the positioning member, based on the movable range and the physical structure of the movable head currently in use.

In another exemplary embodiment, the second determiner 220 may include an superimposing processor 221 and a limitation region determiner 222.

The superimposing processor 221 is configured for superimposing the machining region and the positioning region to obtain an overlapping region and a non-overlapping region.

The limitation region determiner 222 is configured for determining the limitation region based on the overlapping region and the non-overlapping region.

In another exemplary embodiment, the limitation region determiner 222 may include a limitation positioning region determiner 2221 and a limitation machining region determiner 2222.

The limitation positioning region determiner 2221 is configured for taking a non-overlapping region belonging to the machining region as the limitation positioning region.

The limitation machining region determiner 2222 is configured for taking a non-overlapping region belonging to the positioning region as the limitation machining region.

In another exemplary embodiment, the limitation region determiner 222 may further include a limitation machining and positioning region determiner 2223.

The limitation machining and positioning region determiner 2223 is configured for taking a region beyond the overlapping region and the non-overlapping region as the limitation machining and positioning region.

In another exemplary embodiment, the prompt module 230 may include a machining prompter 231 and a positioning prompter 232.

The machining prompter 231 is configured for generating a limitation machining prompt information when the machining element is in the limitation machining region.

The positioning prompter 232 is configured for generating a limitation positioning prompt information when the machining element is in the limitation positioning region.

In another exemplary embodiment, the prompting module 230 may further include a machining and positioning prompter 233.

The machining and positioning prompter 233 is configured for generating a limitation machining and positioning prompt information when the machining element is in the limitation machining and positioning region.

In another exemplary embodiment, the device for limiting the machining element may further include a first identification display 310.

The first identification display 310 is configured for displaying a first identification in the limitation machining region.

In another exemplary embodiment, the device for limiting the machining element may further include a second identification display 320.

The second identification display 320 is configured for displaying a second identification in the limitation positioning region.

In another exemplary embodiment, the device for limiting the machining element may further include a third identification display 330.

The third identification display 330 is configured for displaying a third identification in the limitation machining and positioning region.

In another exemplary embodiment, the device for limiting the machining element may further include a display auxiliary liner 410.

The display auxiliary liner 410 is configured for displaying an auxiliary line at a boundary of the overlapping region, and taking a region within the auxiliary line as a non-limitation region.

It is to be noted that the limiting device for limiting machining elements provided in the above embodiments and the method for limiting machining elements provided in the above embodiments belong to the same idea, the specific ways in which the various modules and units perform the operations are described in detail in the method embodiments, and will not be repeated herein.

The present disclosure also provides a computer numerical control machine, the computer numerical control machine includes a slide rail; a movable head, the movable head slidably provided on the slide rail; a communication component for receiving a limitation region and a prompt information obtained according to the method as in any one of the foregoing embodiments; and a controller for controlling a movement of the movable head on the slide to machine a surface of a machining material based on at least the limitation region and the prompt information.

It is to be noted that after the controller obtains the limitation region and the prompt information, even if the prompt information pops up relevant text prompting words, such as "the machining element exceeds the positioning region, please adjust", "the machining element exceeds the machining region, please adjust", it still can control the movable head to perform laser machining head based on the user's operation instructions. However, the final effect of laser machining in the limitation region is not optimal and does not reach the effect of laser machining in the non-limitation region.

Figure 13:
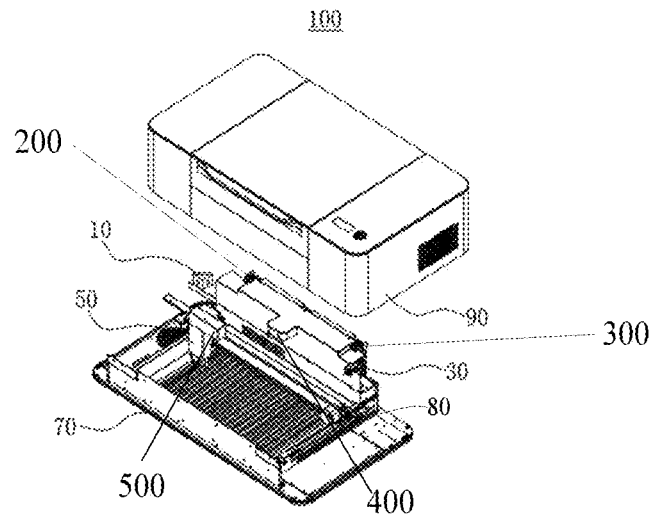
FIG. 13 is a hardware structure diagram of the computer numerical control machine according to an embodiment of the present disclosure.

Referring to FIG. 13, which is a hardware structure diagram of the computer numerical control machine 100 according to an embodiment of the present disclosure. The present disclosure also provides a computer numerical control machine 100, which includes: a slide rail 80, a movable laser head 50, a communication component 200 and a controller 300. The movable laser head 50 is slidably provided on the slide rail; a communication component 200, the communication component is used to receive a computer numerical control machine 100 according to any of the above the steps of the method of any one of the above; the controller controls the movable head 50 to move on the slide rail 80 to machine the surface of the machined material based on at least the limitation region and the prompt information.

In one embodiment, as shown in FIG. 13, the computer numerical control machine 100 includes a housing, a movable laser head 50, a laser tube 30, a close shot camera 500, and a long shot camera 400. The housing includes an upper housing 90 and a bottom housing 70. The close shot camera is provided on the laser head 50. The computer numerical control machine 100 includes cameras, i.e. including but not limited to a long shot camera 400 for capturing a panoramic processing view of the inner space of the housing, and the aforementioned close shot camera, the moveable close shot camera will perform the moving and capturing. The moveable head may include the laser head 50.

In one embodiment, the laser may be generated by the laser head 50, and in another embodiment, the laser light source may be generated by other components such as a laser tube 30 of a carbon dioxide laser tube and passes through a reflector 10 into the laser exit device, and finally exits after passing through the laser head 50 for machining of the workpiece.

In an embodiment, the reflector 10 is provided between the laser head 50 and the laser tube 30, and the laser generated by the laser tube 30 passes through the reflector 10 and is reflected to the laser head 50 and then ejected after reflection, focusing and the like to process the workpiece.

In one embodiment, the housing of the computer numerical control machine 100, i.e., the upper housing 90 and the bottom housing 70 as shown in FIG. 10, together enclose to form an internal space that can accommodate the machining object, and the upper housing 90 and the bottom housing 70 may be removably connected or fixedly connected, or the upper housing 90 and the bottom housing 70 are both of one-piece molding structure. To implement laser machining, the internal space is provided with a laser head 50, a laser tube 30 as a light source, and a close shot camera, and the laser head 50 and the close shot camera are slid by a configured rail device.

In an embodiment, the upper housing 90 is further provided with a rotatable cover plate, and an operator can open the interior space by opening or closing the cover plate to put in or take out a workpiece. The cover plate may be a blocking member that can be opened or closed as described.

Through the blocking and/or filtering effect of the upper housing 90 and the bottom housing 70, it is possible to prevent the laser head 50 from damaging the operator due to laser spillage during operation.

Exemplarily, in an embodiment, a rail device may also be provided in the interior space, and the laser head 50 is mounted on the rail device. The rail device can be X, Y axis guide, X, Y axis guide can be used, such as linear guide, or optical axis and roller with sliding guide, etc., only the laser head 50 can be driven to move in the X, Y axis for machining, the laser head 50 can also be provided with a moving track in Z axis for moving to focus before machining and/or when machining in the Z axis.

Figure 14:
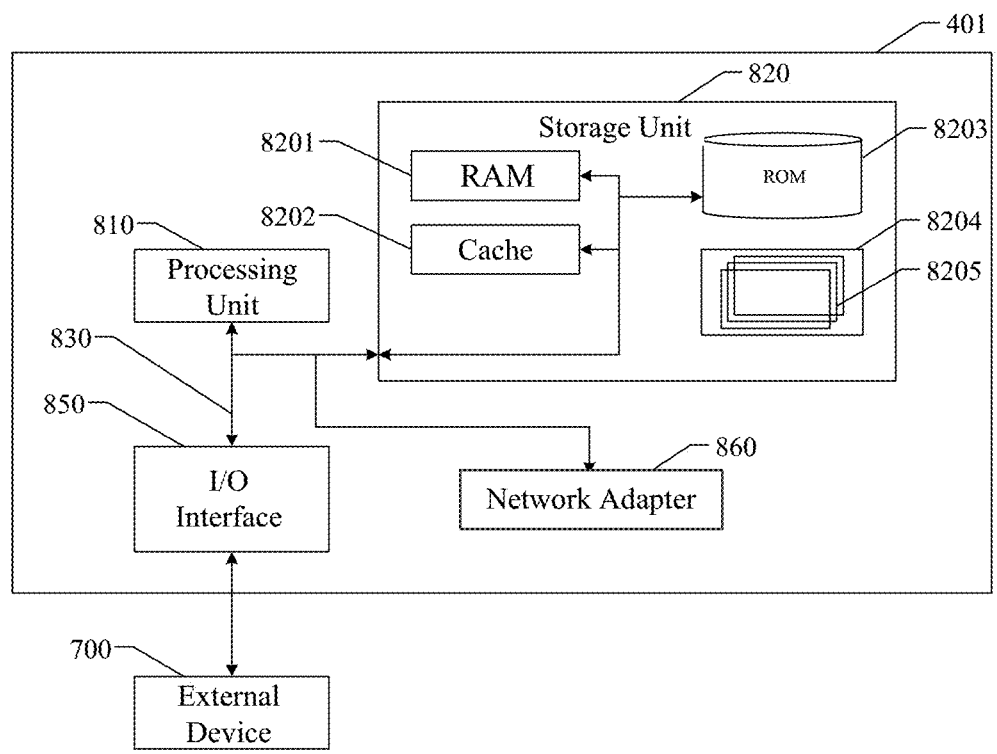
FIG. 14 is a hardware structure diagram of the device for limiting the machining element according to an embodiment of the present disclosure.

In another exemplary embodiment, the method for limiting the machining element of the embodiments of the present disclosure may be realized by the device for limiting the machining element of FIG. 14. The apparatus for limiting the machining element according to embodiments of the present disclosure is described below with reference to FIG. 14. The apparatus for limiting the machining element shown in FIG. 14 is merely an example and should not impose any limitation on the functionality and use scope of the embodiments of the present disclosure.

As shown in FIG. 14, the device for limiting machining element is represented in the form of a general-purpose computing device. Components of the device for limiting machining elements may include, but are not limited to, the at least one processing unit 810 described above, the at least one storage unit 820 described above, and a bus 830 connecting the different system components, including the storage unit 820 and the processing unit 810.

The storage unit stores program code, and the program code may be executed by the processing unit 810, such that the processing unit 810 performs the steps described in the description section of the exemplary method described above in this specification according to various exemplary embodiments of the present disclosure. For example, the processing unit 810 may perform various steps as shown in FIG. 2.

The storage unit 820 may include a readable medium in the form of a volatile storage unit, such as a random access memory unit (RAM) 8201 and/or a cache memory unit 8202, and may also include a read-only memory unit (ROM) 8203.

The storage unit 820 may also include a program/utility 8204 having a set (at least one) of program modules 8205, such program modules 8205 include, but not limited to: an operation system, one or more applications, other program modules, and program data, each of these examples or some combination may include an implementation of a network environment.

The bus 830 may be a local region bus that represents one or more of several types of bus structures, including a memory cell bus or memory cell controller, a peripheral bus, a graphics acceleration port, a processing unit, or a local region bus using any of the multiple bus structures.

The device for limiting the machining element may also communicate with one or more external devices 700 (e.g., keyboards, pointing devices, Bluetooth devices, etc.), may also communicate with one or more devices that enable a user to interact with the device for limiting the machining element, and/or may communicate with any device (e.g., routers, modems, etc.) that enables the device for limiting the machining element to communicate with one or more other computing devices. Such communication may be carried out via an input/output (I/O) interface 850. And, the device for positioning the movable head may also communicate with one or more networks (e.g., local area networks (LANs), wide area networks (WANs), and/or public networks, such as the Internet) via a network adapter 860. As shown, the network adapter 860 communicates with other modules of the device for positioning the movable head via the bus 830. It should be appreciated that, although not shown in the figures, other hardware and/or software modules may be used in conjunction with the device for positioning the movable head, including, but not limited to: microcode, device drivers, redundant processing units, external disk drive arrays, redundant array of independent disks (RAID) systems, tape drives, and data backup storage systems, etc.

By the above description of the implementations, it is readily understood by those skilled in the art that the example implementations described herein can be implemented by software or by software in combination with the necessary hardware. Thus, the technical solution according to the presently disclosed embodiments may be embodied in the form of a software product that may be stored in a non-volatile storage medium (which may be a compact disc read-only memory (CD-ROM), a USB flash drive, a movable hard disk, etc.) or on a network, and that includes a number of instructions to cause a computing device (which may be a personal computer, a server, a terminal device, or a network device, etc.) to perform a method according to the presently disclosed embodiments.

In exemplary embodiments of the present disclosure, there is also provided a computer program medium, on which computer-readable instructions is stored, the computer-readable instructions, when are executed by a processor of the computer, cause the computer to perform the method described in the above method embodiment section.

According to an embodiment of the present disclosure, there is also provided a program product for implementing the method in the above method embodiments, which may employ a portable CD-ROM and include program code, and which may be run on an end device, such as a personal computer. However, the program product of the present disclosure is not limited thereto, herein, the readable storage medium may be any tangible medium that contains or stores a program that may be used by or in combination with an instruction execution system, apparatus, or device.

The program product may employ any combination of one or more readable medium. The readable medium may be a readable signal medium or a readable storage medium. The readable storage medium maybe, for example, but is not limited to, a system, apparatus or device that is electrical, magnetic, optical, electromagnetic, infrared, or semiconducting, or any combination of the above. More specific examples of readable storage medium (a non-exhaustive list) include: an electrical connection having one or more wires, a portable disk, a hard disk, a RAM, a ROM, an erasable programmable read-only memory (EPROM or flash memory), a fiber optic, a portable CD-ROM, an optical storage device, a magnetic storage device, or any suitable combination of the foregoing.

The computer readable signal medium may include a data signal propagated in baseband or as member of a carrier carrying readable program code. Such propagated data signals may take a variety of forms, including, but not limited to, electromagnetic signals, optical signals, or any suitable combination of the foregoing. The readable signal medium may also be any readable medium other than a readable storage medium that sends, propagates, or transmits a program for use by, or in conjunction with, an instruction execution system, apparatus, or device.

The program code contained on the readable medium may be transmitted using any suitable medium including, but not limited to, wireless, wired, fiber optic cable, RF, etc., or any suitable combination of the foregoing.

Program code for performing the operations of the present disclosure may be written in any combination of one or more programming languages, including object-oriented programming languages, such as Java, C++, etc., and conventional procedural programming languages, such as the "C" language or similar programming languages. The program code may be executed entirely on the user computing device, partially on the user device, as a stand-alone software package, partially on the user computing device and partially on a remote computing device, or entirely on a remote computing device or server. In situations involving a remote computing device, the remote computing device may be connected to the user computing device via any kind of network, including a LAN or a WAN, or may be connected to an external computing device (e.g., by utilizing an Internet Service Provider to connect via the Internet).

It should be noted that although a number of modules or units of the device for action execution are mentioned in the detailed description above, this division is not mandatory. Indeed, according to embodiments of the present disclosure, the features and functions of two or more modules or units described above may be specified in a single module or unit. Conversely, the features and functions of one module or unit described above may be divided to be materialized by more than one module or unit.

Furthermore, although the various steps of the method in the present disclosure are described in the accompanying drawings in a particular order, it is not required or implied that the steps must be performed in that particular order or that all of the steps shown must be performed in order to achieve the desired result. Additional or alternatively, certain steps may be omitted, a plurality of steps may be combined to be performed as a single step, and/or a single step may be broken down to be performed as a plurality of steps, etc.

By the above description of the embodiments, it is readily understood by those skilled in the art that the embodiments described herein may be implemented by software or by software in combination with the necessary hardware. Thus, the technical solution according to the presently disclosed embodiments may be embodied in the form of a software product that may be stored in a non-volatile storage medium (which may be a CD-ROM, a USB flash drive, a movable hard disk, etc.) or on a network, and that includes a number of instructions to cause a computing device (which may be a personal computer, a server, a mobile terminal, or a network device, etc.) to perform the method according to the presently disclosed embodiments.

Other embodiments of the present disclosure will readily come to mind to those skilled in the art upon consideration of the specification and practice of the invention disclosed herein. The present disclosure is intended to cover any variations, uses, or adaptations of the present disclosure that follow the general principles of the present disclosure and include common knowledge or customary technical means in the art not disclosed herein. The specification and embodiments are to be regarded as exemplary only, and the true scope and spirit of the present disclosure is indicated by the appended claims.

What is claimed is:

1. A machining method, comprising:
    determining, by a processor, a machining region of a machining member and a positioning region of a positioning member based on a movable range of a movable head, wherein the machining member and the positioning member are mounted at different positions of the movable head, respectively;
    determining, by a communication medium, a limitation region on a target interface comprising a machining element based on the machining region and the positioning region;
    generating, by the communication medium, a corresponding prompt information when the machining element is in the limitation region; and
    controlling, by a controller, the movable head to machine a surface of a machining material after the limitation region is determined;
    wherein determining the limitation region on the target interface displayed on the software based on the machining region and the positioning region comprises:
        superimposing the machining region and the positioning region to obtain an overlapping region and anon-overlapping region; and
        determining the limitation region based on the overlapping region and the non-overlapping region.

2. The machining method according to claim 1, wherein the limitation region comprises a limitation positioning region and a limitation machining region, and determining the limitation region based on the overlapping region and the non-overlapping region comprises: taking a non-overlapping region belonging to the machining region as the limitation positioning region; and taking a non-overlapping region belonging to the positioning region as the limitation machining region.

3. The machining method according to claim 2, wherein generating the corresponding prompt information when the machining element is in the limitation region comprises: generating a limitation machining prompt information when the machining element is in the limitation machining region; and generating a limitation positioning prompt information when the machining element is in the limitation positioning region.

4. The machining method according to claim 2, wherein generating the corresponding prompt information when the machining element is in the limitation region comprises: displaying a first identification in the limitation machining region.

5. The machining method according to claim 4, wherein identifications comprise the first identification displayed in the limitation machining region, a second identification displayed in the limitation positioning region, and a third identification displayed in a limitation machining and positioning region, and the first identification, the second identification, and the third identification have different colors or different shades of the same color.

6. The machining method according to claim 2, wherein generating the corresponding prompt information when the machining element is in the limitation region comprises: displaying a second identification in the limitation positioning region.

7. The machining method according to claim 2, wherein generating the corresponding prompt information when the machining element is in the limitation region further comprises: displaying a third identification in a limitation machining and positioning region.

8. The machining method according to claim 1, wherein the limitation region further comprises a limitation machining and positioning region, and determining the limitation region based on the overlapping region and the non-overlapping region further comprises: taking a region beyond the overlapping region and the non-overlapping region as the limitation machining and positioning region.

9. The machining method according to claim 8, wherein generating the corresponding prompt information when the machining element is in the limitation region further comprises: generating a limitation machining and positioning prompt information when the machining element is in the limitation machining and positioning region.

10. The machining method according to claim 1, further comprising: displaying an auxiliary line at a boundary of the overlapping region, and taking a region within the auxiliary line as a non-limitation region.

11. The machining method according to claim 1, wherein determining the machining region of the machining member and the positioning region of the positioning member based on the movable range of the movable head comprises: determining a type of the movable head currently in use; wherein each type of the movable head corresponds to a physical structure, and the physical structure comprises a distance between the machining member and the positioning member; determining the physical structure of the movable head currently in use based on a correspondence between the type of the moveable head and the physical structure; and determining the machining region of the machining member and the positioning region of the positioning member, based on the movable range and the physical structure of the movable head currently in use.

12. A machining device, comprising: a memory storing computer readable instructions; and a processor, reading the computer-readable instructions stored in the memory to perform the machining method of claim 1.

13. A non-transitory computer-readable medium having computer-readable instructions stored thereon, wherein the computer-readable instructions, when executed by a processor of a computer, cause the computer to perform the machining method of claim 1.

14. The machining method according to claim 1, wherein the method is applied to a computer numerical control (CNC) machine, the CNC machine comprises a slide rail and the movable head, and the movable head is slidably provided on the slide rail, and the movable head is movable on the slide rail to process the surface of the machining material.

15. The machining method according to claim 14, wherein the CNC machine comprises a housing and a cover plate, an internal space is provided inside the housing, and the slide rail and the movable head are located within the internal space, and the cover plate is rotatably provided on the housing to open or close the internal space.

16. A computer numerical control machine, comprising:
a slide rail;
a movable head slidably provided on the slide rail;
a communication component, for determining a limitation region on a target interface comprising a machining element based on a machining region and a positioning region and for generating a corresponding prompt information when the machining element is in the limitation region; and
a controller, for controlling a movement of the movable head on the slide rail to machine a surface of a machining material after the limitation region is determined;
wherein determining the limitation region on the target interface based on the machining region and the positioning region comprises:
superimposing the machining region and the positioning region to obtain an overlapping region and a non-overlapping region; and
determining the limitation region based on the overlapping region and the non-overlapping region.

17. The computer numerical control machine according to claim 16, wherein the limitation region comprises a limitation positioning region and a limitation machining region, and determining the limitation region based on the overlapping region and the non-overlapping region comprises: taking the non-overlapping region belonging to the machining region as the limitation positioning region; and taking the non-overlapping region belonging to the positioning region as the limitation machining region.

18. The computer numerical control machine according to claim 17, wherein generating the corresponding prompt information when the machining element is in the limitation region comprises: generating a limitation machining prompt information when the machining element is in the limitation machining region; and generating a limitation positioning prompt information when the machining element is in the limitation positioning region.

19. The computer numerical control machine according to claim 16, wherein the limitation region further comprises a limitation machining and positioning region, and determining the limitation region based on the overlapping region and the non-overlapping region further comprises: taking a region beyond the overlapping region and the non-overlapping region as the limitation machining and positioning region.

* * * * *